INVENTOR.
WILLIAM E. BRADLEY
BY
Allen V. Hazeltine
ATTORNEY

INVENTOR.
WILLIAM E. BRADLEY
BY
Allen V. Hazeltine
ATTORNEY 2,713,605

ELECTRICAL SYSTEMS

William E. Bradley, New Hope, Pa., assignor to Philco Corporation, Philadelphia, Pa., a corporation of Pennsylvania Application April 18, 1952, Serial No. 282,957

10 Claims. (Cl. 178—5.4)

The present invention relates to electrical systems and more particularly to cathode-ray tube systems comprising a beam intercepting structure and indexing means arranged in cooperative relationship with the beam intercepting structure and adapted to produce a signal whose time of occurrence is indicative of the position of the cathode-ray beam.

The invention is particularly adapted for, and will be described in connection with, a color television image system utilizing a single cathode-ray tube having a beam-intercepting, image-forming screen member comprising vertical stripes of luminescent materials. These stripes are preferably arranged in laterally-displaced color triplets, each triplet comprising three vertical phosphor stripes which respond respectively, to electron impingement to produce light of different primary colors. The order of arrangement of the stripes may be such that the normally horizontally scanning cathode-ray beam produces red, green and blue light successively. From a color television receiver there may then be supplied three separate video signals, each indicative of a different primary color component of the televised scene, which signals are sequentially utilized to control the intensity of the cathode-ray beam. For proper color rendition, it is then required that, as the phosphor stripes producing each of the primary colors of light are impinged by the cathode-ray beam, the intensity of the beam be simultaneously controlled in response to the contemporaneous value of the video signal representing the corresponding color component of the televised image.

To achieve such a synchronous relationship throughout the scanning cycle it has been proposed to derive, from the beam intercepting structure, indexing signals indicative of the instantaneous position of the cathode-ray beam upon the image-forming screen, and to utilize these indexing signals to control the relative phase of the signal applied to the beam intensity controlling system. The said indexing signals may be derived from a plurality of beam responsive signal generating regions of the beam intercepting structure, which regions are disposed in a geometric configuration indicative of the geometric configuration of the color triplets. In one form, these regions may be constituted by a plurality of indexing stripe members arranged on the beam intercepting screen structure so that, as the beam scans the screen, the indexing stripes are excited in spaced time sequence corresponding to the scanning of the color triplets and a series of pulses is generated in a suitable output electrode system of the cathode-ray tube.

Such indexing stripes may comprise a material having secondary-emissive properties which differ from the secondary-emissive properties of the remaining portions of the beam intercepting structure. For example, such indexing stripes may consist of a high atomic number material such as gold, platinum or tungsten or may consist of certain oxides such as cesium oxide or magnesium oxide. Alternatively, such indexing stripes may consist of a fluorescent material, such as zinc oxide, having a spectral output in the non-visible light region and the indexing signals may be derived from a suitable photoelectric cell arranged, for example, in a side wall portion of the cathode-ray tube out of the path of the cathode-ray beam and facing the beam intercepting surface of the screen structure.

To achieve a desired degree of definition comparable to that commonly available in so-called black-and-white image reproducers, the image reproducing screen of the cathode-ray tube should contain a relatively large number of groups of phosphor stripes. In the case of a cathode-ray tube screen constituted by vertically arranged color triplets, the number of triplets should approximate the number of picture elements contained in one line scan of the reproduced image and in a typical case there may be approximately 350 to 400 color triplets arranged on the screen of the cathode-ray tube.

As a general rule, the rate at which the beam scans the phosphor stripes and the associated index stripes can be maintained constant only within certain practical limits. This is due to the facts that the index stripes of the phosphor stripes are normally deposited on the screen surface with only a certain degree of precision dictated by economic considerations and manufacturing tolerances so that certain non-uniformity in the distribution of the stripes on the screen surface can normally be expected. Furthermore, in order to achieve a uniform scanning velocity, it is necessary that the beam deflection signal conform absolutely to a pre-established wave form determined by the geometry of the tube. In this connection, it will be noted that when the cathode-ray tube is sufficiently long, and/or has a sufficiently small screen area so that the normally aspheroidal screen surface is, in effect, concentric to the effective deflection center of the scanning beam, the deflecting signal must exhibit a linearly varying amplitude. When the screen has approximately 400 color triplets arranged thereon, this linearity must be held to a tolerance of the order of one part in 12,000 to achieve faithful color reproduction. In practice, this problem is much more severe because, desirably, the cathode-ray tube is made relatively short and/or has a large screen area so that the aspheroidal surface of the screen departs considerably from concentricity to the effective deflection center of the beam. In this case, the deflection of the beam at constant velocity over the surface of the screen requires a deflection signal having a more complex waveform and the difficulty of generating such a signal within the necessary close tolerance value is correspondingly increased.

The departures from constant velocity, as the beam scans the screen structure, produce corresponding changes in the frequency of the indexing signal produced by the screen structure.

The indexing signal, generated by the action of the scanning beam on the screen structure, is a low intensity signal and must be appropriately amplified to make it suitable for controlling the phase of the video signal applied to the beam intensity controlling system in the desired synchronous relationship to the position of the scanning beam. In addition, it is desirable to filter and limit the generated indexing signal to separate it from spurious components also generated at the screen structure by the scanning beam. The auxiliary equipments, necessary for so processing the generated indexing signal, introduce a time delay which, in the case of a high definition screen structure of the type above described, may correspond to the time required to scan several color triplets. Since, normally, the rate of scanning the color triplets varies during the scanning period, the length of this time delay, relative to the time required to scan successive color triplets correspondingly varies. Moreover, since desirably the filtering system is characterized by a relatively narrow band-pass spectrum, the time delay introduced thereby varies with variations of the frequency of the generated indexing signal. As a result, the output indexing signal is no longer in phase coincidence with the generated indexing signal but rather undergoes additional phase variations as determined by the variations of the frequency of the generated index signal.

The foregoing undesired phase shifts of the amplified indexing signal may be sufficient to produce a complete loss of color synchronism between the position of the beam on the screen structure and the contemporaneous value of the color video signal applied to the beam intensity control system of the cathode-ray tube.

It is an object of the invention to provide improved cathode-ray tube systems of the type in which the position of an electron beam on a beam intercepting screen structure is indicated by an indexing signal derived from the indexing member.

A further object of the invention is to provide a cathode-ray tube system of the foregoing type in which undesired phase variations of the indexing signal normally produced during processing the indexing signal are obviated.

Another object of the invention is to provide a color television cathode-ray tube reproducing system in which accurate color rendition is achieved notwithstanding non-uniformities of the distribution and scanning of the color reproducing elements of the image screen of the cathode-ray tube.

Still another object of the invention is to provide a color television cathode-ray tube reproducing system for producing an indexing signal, the phase of the variations of which are directly related to the time phase intervals at which the image reproducing elements of the screen of the cathode-ray tube are scanned.

These and further objects of the invention will appear as the specification progresses.

In accordance with the invention, the foregoing objects are achieved in a cathode-ray tube system adapted to generate an indexing signal having variations, the nominal time phase positions of which are indicative of the positions of the beam, and having further time phase variations proportional to variations of the frequency of the generated indexing signal, by deriving from the generated indexing signal a control quantity proportional to the frequency deviations of the indexing signal from its nominal value and by phase modulating the indexing signal proportionally to the value of the control quantity in a sense tending to cancel the undesired phase variations of the indexing signal. In a representative embodiment, the system of the invention embodies a frequency discriminating system coupled to the index signal generating system and adapted to produce a control quantity proportional to frequency variations of the indexing signal from a given nominal value, and further embodies a phase modulator to which the indexing signal is applied as an input signal. By varying the phase of the applied input signal as determined by the above referred to control signal, an output indexing signal is produced which is free from undesired phase variations.

The invention will be described in greater detail with reference to the appended drawings forming part of the specification and in which.

Figures 1, 2:
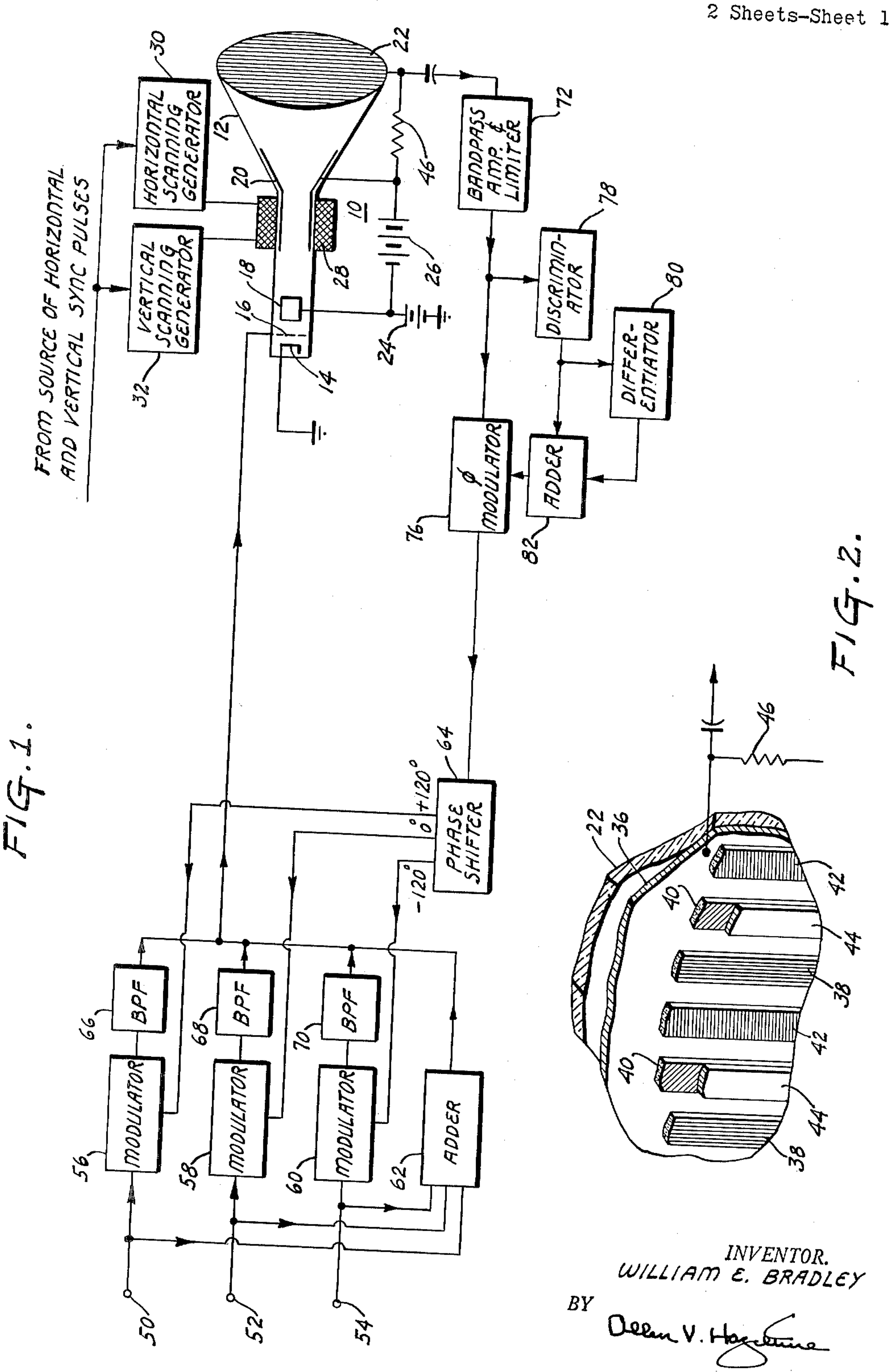
Figure 1 is a block diagram showing one form of a cathode-ray tube system in accordance with the invention.
Figure 2 is a perspective view of a portion of one form of an image reproducing screen structure suitable for the cathode-ray tube systems of the invention.

Referring to Figure 1, the cathode-ray tube system there shown comprises a cathode-ray tube 10 containing, within an evacuated envelope 12, a beam generating and intensity control system comprising a cathode 14, a control grid 16, a focusing anode 18 and an accelerating anode 20, the latter of which may consist of a conductive coating on the inner wall of the envelope, which terminates at a point spaced from the end face 22 of the tube in conformance with well established practice. Electrodes 18 and 20 are maintained at their desired operating potentials by suitable voltage sources shown as batteries 24 and 26, the battery 24 having its positive pole connected to the anode 18 and its negative pole connected to a point at ground potential, and the battery 26 being connected with its positive pole to electrode 20 and its negative pole to the positive pole of battery 24. In practice, the battery 24 has a potential of the order of 1 to 3 kilovolts whereas the battery 26 has a potential of the order of 10 to 20 kilovolts.

A deflection yoke 28 coupled to horizontal and vertical deflection signal generators 30 and 32 respectively, of conventional design, is provided for deflecting the beam across the face plate 22 of the tube to form a raster thereon.

The end face 22 of the tube 10 is provided with a beam intercepting structure 34, one suitable form of which is shown in Figure 2. In the arrangement shown in Figure 2, the structure 34 is formed directly on the face plate 22, however, it should be well understood that the structure 34 may be formed on a suitable light transparent base which is independent of the face plate 22 and may be spaced therefrom. In the arrangement shown, the face plate 22, which in practice consists of glass having preferably substantially uniform transmission characteristics for the various colors of the visible spectrum, and having a light transparent conductive coating 36 which may be a coating of stannic oxide or of a metal such as silver, having a thickness only sufficient to achieve the desired conductivity, is provided with a plurality of parallelly arranged stripes 38, 40 and 42 of phosphor materials which, upon impingement of the cathode-ray beam, fluoresce to produce light of three different primary colors. For example, the stripe 38 may consist of a phosphor such as zinc phosphate containing manganese as an activator, which upon electron impingement produces red light, the stripe 40 may consist of a phosphor such as zinc orthosilicate, which produces green light, and the stripe 42 may consist of a phosphor such as calcium magnesium silicate containing titanium as an activator, which produces blue light. Other suitable materials which may be used to form the phosphor stripes 38, 40 and 42 are well known to those skilled in the art, as well as methods of applying the same to the face plate 22, and further details concerning the same are believed to be unnecessary.

Each of the groups of stripes may be termed a color triplet, and as will be noted, the sequence of the stripes is repeated in consecutive order over the area of the structure 34.

Arranged over consecutive stripes 40 are indexing stripes 44 consisting of a material having a secondary-emissive ratio detectably different from that of the remainder of the structure 34. The stripes 44 may be of gold or of other high atomic number metal such as platinum or tungsten, or of an oxide such as magnesium oxide as previously pointed out.

The beam intercepting structure so constituted is connected to the positive pole of battery 26 through a load impedance 46 by means of a suitable connection to the conductive coating 36 thereof.

For reproducing a color image on the face plate of the cathode-ray tube there are provided color signal input terminals 50, 52 and 54 which are supplied from a television receiver (not shown) with separate signals indicative of the red, green and blue components of the televised scene, respectively. The system then operates to effectively convert these three color signals into a wave having the color information arranged in time reference sequence so that the red information occurs when the cathode-ray beam impinges the red stripes 38 of the beam intercepting structure 34, the green information occurs upon impingement of the green stripes 40 and the blue information occurs when the blue stripes 42 are impinged.

The conversion of the color signals into a wave having the color information arranged in time reference sequence may be achieved by means of a modulation system suitably energized by the respective color signals and by appropriately phase related modulating signals. In the arrangement shown, the desired conversion is effected by sine wave modulators 56, 58 and 60 in conjunction with an adder 62. Modulators 56, 58 and 60 may be of conventional form and may each consist, for example, of a dual grid thermionic tube, to one grid of which is applied the color signal from the respective terminals 50, 52 and 54 and to the other grid of which is applied an individual modulating signal. The modulating signals may be derived from a phase shifter 64 adapted to produce, by means of suitable phase shifting networks, three modulation voltages appropriately phase displaced. In the arrangement specifically described, wherein the phosphor stripes 38, 40 and 42 (see Figure 2) are uniformly distributed throughout the width of each color triplet, the modulation voltages from the phase shifter 64 bear a 120° phase relationship as shown.

The individual waves produced at the outputs of the modulators will be sine waves, each amplitude modulated by the color signal applied to the respective modulators and each having a phase relationship determined by the particular modulation signal applied to the respective modulators. The three modulators are coupled with their outputs in common to produce a resultant wave having a frequency at the frequency of an indexing signal applied to the phase shifter 64 as later to be more fully described, and having amplitude and phase variations proportional to the variations of the amplitudes of the color signals at terminals 50, 52 and 54.

Each of the color signals applied to the input terminals 50, 52 and 54 will, in general, include a reference level component definitive of brightness. While each of the modulators above specifically described normally transmits this reference level component to its output, it is preferable to suppress the individual reference level components from the modulators, for example, by means of band-pass filters 66, 68 and 70 respectively, and to process the brightness information in a separate channel. Accordingly, in the system shown in Figure 1, the three color signals are combined in proper proportions to produce a single signal representative of the overall brightness of the image elements to be reproduced, and this signal is in turn combined with the outputs of the modulators.

The resultant wave derived from the modulators 56, 58 and 60, and from the adder 62, is applied as a control potential to the control electrode 16 of the tube 10, whereby the intensity of the beam is varied in time sequence by amounts proportional to the amplitudes of the input signals at terminals 50, 52 and 54. These intensity variations of the beam are made to occur in synchronism with the scanning of the phosphor stripes, so that the beam has an intensity value determined by one of the input signals when the beam impinges a given one of the phosphor stripes, the beam has a second intensity value as determined by a second of the input signals when the beam impinges a second of the phosphor stripes, and has a third intensity value as determined by the third input signal when the beam impinges on the third of the phosphor stripes.

Synchronization between the contemporaneous value of the signal applied to the control grid 16 and the scanning of the phosphor stripes is achieved by means of an indexing signal generated by the action of the scanning beam on the indexing stripes 44 and derived from the screen structure by means of an indexing signal circuit coupled to the load impedance 46 and comprising a band-pass amplifier and limiter 72.

As a rule, the indexing signal generated across load impedance 46 is a low level signal and is contaminated to a greater or lesser degree by spurious signals also produced at the screen structure by the scanning beam. For example, there may also be generated across load resistor 46 inter-modulation products due to the intensity variations of the beam brought about by the image signal applied thereto, and noise products due to minor but nevertheless apparent differences in secondary emissivity of the phosphor stripes. Accordingly, the amplifier system 72 must be characterized by sufficient gain to amplify the indexing signal generated across the load impedance 46 to a conveniently usable level for its ultimate application to the modulators 56, 58 and 60 through the phase shifter 64, and should include amplitude limiting means for maintaining the output signal thereof at a constant amplitude value. Furthermore, and preferably, the amplifier also embodies suitable band-width limiting means so that the desired indexing signal may be separated from spurious components also generated at the screen structure and appearing across load resistor 46.

Due to the relatively large transit time effects inherent to the high gain amplifier 72, the indexing signal appearing at the output of the amplifier will be phase delayed with respect to the input signal by an amount which, in the high definition reproducing systems of the type herein specifically described, may correspond to the time consumed in scanning several color triplets of the screen structure. Furthermore, because the transmission band-width of the amplifier is preferably restricted to achieve the desired frequency selection of the indexing signal from the simultaneously generated spurious components, this phase delay is not a constant value for all frequencies within the pass-band of the amplifier.

As previously pointed out, it is economically unfeasible to achieve absolute correlation between the wave form of the beam deflection signal and the contour of the image screen and to thereby scan the beam across the screen surface at an absolutely constant rate. Furthermore, notwithstanding careful adherence to good engineering practice, there occur unavoidable variations in the uniformity of the spacing with which the phosphor stripes and the associated indexing stripes are deposited on the surface of the screen structure.

Accordingly, the indexing signal produced by the interaction of the scanning beam and the indexing stripes exhibits frequency variations about a nominal frequency value, the excursions of which are determined by variations of the velocity at which the beam intercepts consecutive indexing stripes.

Due to the variations of rate at which the successive color triplets of the screen structure are scanned by the beam, the time delay inherent in the amplifier 72 bears a variable ratio to the time required to scan successive color triplets.

In a typical instance in which the frequency of the generated indexing signal varies 10% from its nominal value, the change in the ratio between the transit time delay of the amplifier 72 and the time required to scan successive color triplets may be sufficient to produce a 180° phase error between the instantaneous value of the video signal applied to control electrode 16 and the impingement of the beam on a given phosphor stripe. This phase error is further enhanced by the phase variations to which the signal is subjected because of the phase versus frequency characteristic of the amplifier due to its restricted band-width.

In accordance with the invention the foregoing ill effects, due to the transit time delay through the amplifier system 72 and due to the variations of this time delay by reason of the phase-versus frequency characteristic of the amplifier, are obviated by phase modulating the indexing signal in a sense tending to cancel the undesired phase variations thereof. More particularly, and as shown in Figure 1, the system of the invention embodies a phase modulator 76 coupled to the amplifier 72 and the phase shifter 64 and a frequency sensitive discriminator 78 adapted to apply to the phase shifter 76 a phase controlling signal proportional to the frequency deviations of the generated index signal from its nominal frequency value as established by the nominal scanning rate of the beam and the number of index stripes contained on the screen structure.

Phase modulator 76 may be of conventional form and may consist, for example, of an inductance-capacitance circuit resonant at the nominal frequency of the indexing signal and a reactance tube such as a Miller-type capacitance shunting the tuned circuit and adapted to vary its resonant frequency as a function of the amplitude of a control signal applied to a grid of the reactance tube. For achieving large phase shifts, the phase modulator 76 may be of the type described by E. Labin, in U. S. Patent No. 2,372,210, dated March 27, 1945, wherein variations of the transit time of an electron beam between a point of origin of the beam and a target electrode under the influence of a control potential serve to produce corresponding phase variations of an input signal.

The frequency sensitive discriminator 78, serving to produce a control quantity having amplitude variations proportional to the frequency variations of the generated indexing signal from the nominal value thereof, may be of well-known form and may consist, for example, of a Foster-Seeley type discriminator having its cross-over frequency equal to the nominal frequency equal to the nominal frequency of the indexing signal.

The system operates to cancel the undesired variations of the relative phase between the signal applied to the control electrode 16 and the indexing signal generated at the screen structure which are brought about by the indexing signal processing equipment contained in the indexing circuit. More particularly, upon a change from the nominal frequency of the generated indexing signal because of non-uniformity in the distribution of the phosphor and indexing stripes on the screen structure and/or because of variations of the scanning velocity of the beam across the screen 34, the discriminator 78 produces a control quantity proportional to the deviation from the said nominal frequency. This control quantity is applied to the phase modulator 76 which operates to vary the phase of the signal from amplifier 76 in a sense tending to correct the undesired phase variations, so that the signal applied to phase shifter 64 has a time phase position which insures absolute synchronism between the contemporaneous value of the signal at control electrode 16 and the scanning of the phosphor stripes. By appropriately adjusting the output characteristic of the discriminator 78, i. e., by adjusting the sensitivity thereof, the amount of the phase shift produced by the phase modulator may be controlled as desired so that a correcting phase shift even sufficient to compensate for transit time effects in the modulators 56, 58 and 60 and in the transit time of the beam of the tube 10 may be achieved as well.

To facilitate the action of the phase modulator 76 there may be applied thereto, in accordance with a further feature of the invention, an additional controlling signal proportional to the rate of change of the frequency of the generated indexing signal. Such an additional controlling signal which may be derived from the discriminator 78 by means of a differentiating network 80 coupled thereto, is applied to the phase modulator in conjunction with the output signal from discriminator 78 by means of a suitable combining network shown as the adder 82. For example, when the phase modulator 76 consists of a tuned circuit shunted by a reactance tube as above described, the control signal from differentiator 80 may be applied to the control grid of the reactance tube together with the control signal from discriminator 78 through a network 82 consisting of two triode tubes with individual grid electrodes and a common output impedance for producing an output voltage which is the algebraic sum of the signals from discriminator 78 and differentiator 80 applied to the respective grid electrodes.

Figure 3:
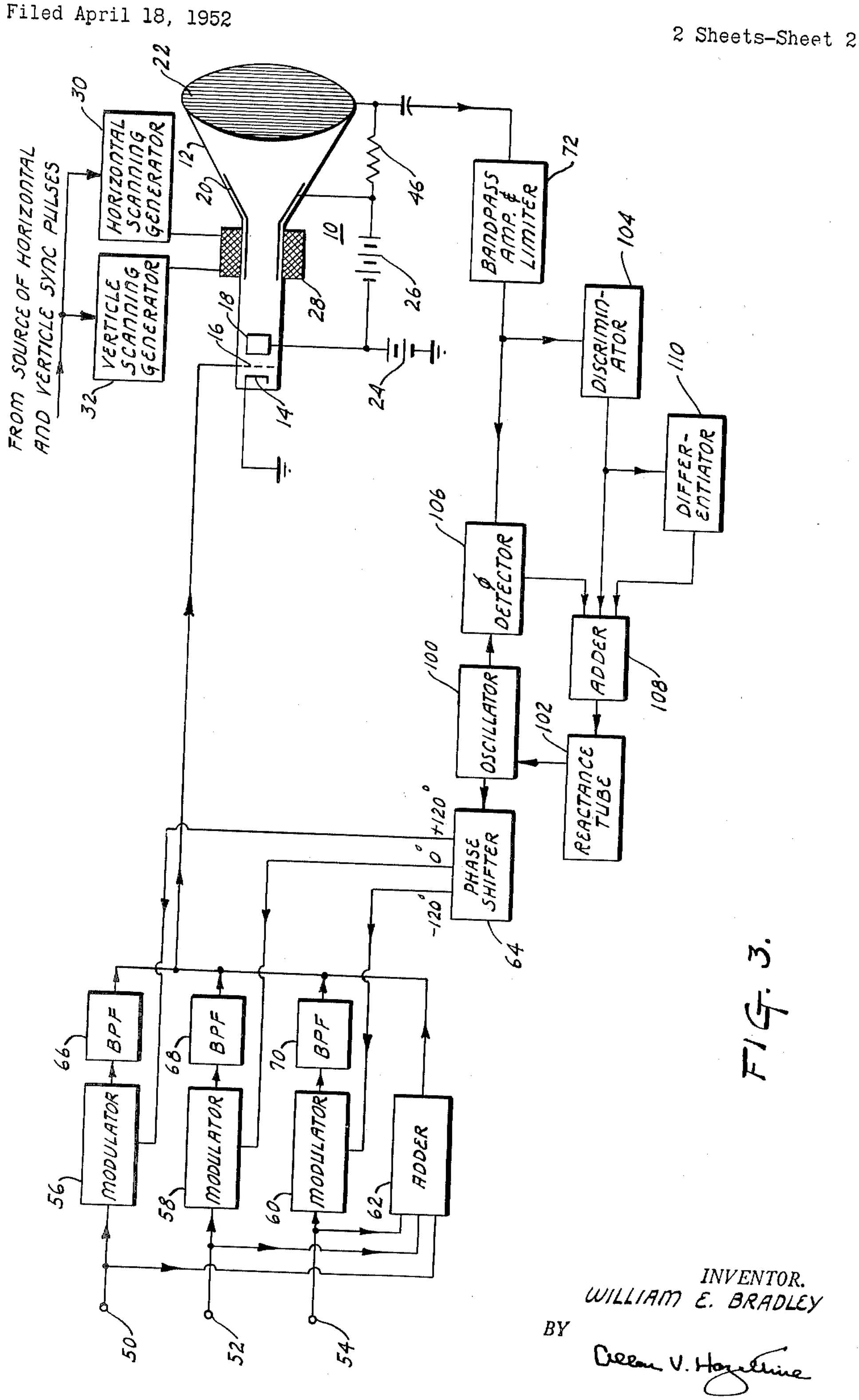
Figure 3 is a block diagram showing another form of a cathode-ray tube system in accordance with the invention.

Figure 3 illustrates a second embodiment of the system of the invention in which an oscillator is used to supply modulating signals in phase synchronism with the impingement of the beam on the phosphor and index stripes of the screen structure. As will be noted, many of the components of the system shown are similar to the components of the system of Figure 1, and accordingly these components have been indicated by the same reference numerals. Thus, in the system shown in Figure 3, the televised image is reproduced by means of a cathode-ray tube 10 similar to that above described and comprising a cathode 14, a control electrode 16, a focusing electrode 18, an accelerating electrode 20, and a face plate 22 carrying a beam intercepting screen structure embodying vertically arranged phosphor stripes and indexing stripes as shown in Figure 2. Suitable sources 24 and 26 are supplied for energizing the electrodes, the beam intercepting screen structure being conencted to the source 26 through a load resistance 46 as previously described. A horizontal and vertical deflection yoke 28 energized by horizontal and vertical scanning generators 30 and 32 is similarly supplied for deflecting the cathode-ray beam to form a raster on the beam intercepting structure.

For reproducing a color image on the face plate of tube 10 there are provided input terminals 50, 52 and 54 which are supplied from a receiver (not shown) with separate signals indicative of the red, green and blue components of the televised scene respectively. These three signals are converted into a wave having the color information arranged in time reference sequence with the scanning of the phosphor stripes by means of modulators 56, 58 and 60 and an adder 62 as previously described, appropriate modulating signals being supplied to the modulators from a phase shifter 64 in the manner previously described. The modulators may include in their output circuits suitable band-pass filters 66, 68 and 70 whereby the reference level component of each of the input signals is excluded from the outputs of the modulators.

The phase shifter 64 is energized by an oscillator 100, the frequency and phase of which is made to synchronize with the frequency and phase of the indexing signal generated by the action of the scanning beam over the indexing stripes of the image reproducing screen. This synchronous relationship is maintained notwithstanding time delays and variable phase shifts produced by the auxiliary equipment necessary to process the indexing signal, in a manner later to be more fully described, so that absolute synchronism between the scanning of the phosphor stripes and the contemporaneous value of the signal applied to control electrode 16 is achieved.

Oscillator 100 may conform to conventional design and may consist, for example, of an electron discharge tube the electrodes of which are intercoupled in feedback relationship by means of a capacitance-inductance circuit which is resonant at the nominal frequency of the indexing signal generated at the screen structure of the tube 10. For controlling the frequency and phase of the oscillator 100 there is provided a variable reactance element 102 shunting the tuned circuit of the oscillator and consisting, for example, of a Miller-type or similar variable reactance tube.

The indexing signal generated at the screen structure of the tube 10 is separated from the spurious components produced at the screen structure and amplified to a conveniently usable level by means of a bandpass amplifier and limiter system 72 similar to that described in connection with Figure 1. As previously pointed out, the processing of the indexing signal by the amplifier system 72 brings about a condition in which the output signal of the amplifier may differ in phase from the input signal and the phase difference is a variable quantity proportional to the frequency deviations of the generated indexing signal from its nominal value. In order to compensate for this phase change the embodiment of the invention shown in Figure 2 comprises a frequency sensitive discriminator 104 which is coupled to the output of amplifier 72 and is adapted to produce a first control quantity proportional to deviations of the frequency of the generated indexing signal from its nominal value. Discriminator 104 may be similar to discriminator 78 described in connection with the system of Figure 1.

The system further comprises a phase detector 106 coupled to the amplifier 72 and the oscillator 100 and by means of which a second control signal is produced having an amplitude proportional to the phase difference between the wave produced by oscillator 100 and the wave at the output of amplifier 72. Phase detector 106 may be of conventional form and may consist, for example, of two diode tubes having a common load impedance and adapted to be energized in phase opposition by one of the input signals and energized in shunt by the other of the input signals.

The two control signals so derived are algebraically combined in an adding network 108 and the resultant voltage is aplied to the variable reactance system 102 which controls the frequency and phase of the oscillator 100. By appropriately adjusting the sensitivities of the discriminator 104 and phase detector 106 the relative degrees of control exerted by these elements may be adjusted. As a rule, the sensitivity of the discriminator 104 is adjusted to over-compensate the oscillator 100 so that the frequency variations so produced normally tend to be greater than the frequency variations of the generated indexing signal. The sensitivity of the phase detector 106 may then be adjusted to correct this overcompensation.

In order to facilitate the synchronizing action of the system, there may be applied additionally to the variable reactance 102 a third control voltage proportional to the rate of change of the frequency of the generated indexing signal. Such a third control voltage may be produced by means of a differentiating network 110 similar to the network 80 of Figure 1, and which is coupled to the output of the discriminator 104 and applied to the variable reactance 102 through the adder 108.

While I have described my invention by means of specific examples and in specific embodiments, I do not wish to be limited thereto, for obvious modifications will occur to those skilled in the art without departing from the spirit and scope of the invention.

What I claim is:

1. A cathode-ray tube system comprising a cathode-ray tube having a source of a beam of charged particles and a beam intercepting member, said beam intercepting member comprising a plurality of first elemental areas having a first given response characteristic upon impingement by said beam and comprising second elemental areas having a second given response characteristic upon impingement by said beam different from the response characteristic of said first elemental areas, said second elemental areas being arranged in a geometrical configuration indicative of the geometrical configuration of said first elemental areas, means for scanning said beam across said first and second elemental areas at a given nominal rate to thereby energize said first and second elemental areas, means to derive a signal quantity determined by the response characteristic of said second elemental areas and having a nominal frequency determined by the said nominal rate of scanning said elemental areas, means to derive from said signal quantity a control quantity determined by variations of the frequency of said signal quantity from said nominal frequency value, means to produce a signal wave having a nominal frequency determined by the nominal frequency of said signal quantity, and means responsive to said control quantity to angle modulate said signal wave as a function of said frequency variations of said signal quantity from the said nominal frequency value thereof.

2. A cathode-ray tube system as claimed in claim 1 wherein said means to produce said signal wave is supplied with said signal quantity and wherein said angle modulating means comprises a phase modulator supplied with said signal wave and energized by said control quantity.

3. A cathode-ray tube system as claimed in claim 1 wherein said means to produce said signal wave comprises an oscillator source having a nominal frequency equal to the nominal frequency of said signal quantity and wherein said angle modulating means comprises a variable reactance system coupled to said oscillator and energized by said control quantity.

4. A cathode-ray tube system comprising a cathode-ray tube having a source of a beam of charged particles and a beam intercepting member, said beam intercepting member comprising a plurality of first elemental areas having a first given response characteristic upon impingement by said beam and comprising second elemental areas having a second given response characteristic upon impingement by said beam different from the response characteristic of said first elemental areas, said second elemental areas being arranged in a given geometrical configuration indicative of the geometrical configuration of said first elemental areas, means for scanning said beam across said first and second elemental areas at a given nominal rate to thereby energize said first and second elemental areas, a signal transmission path for deriving a signal quantity determined by the response characteristic of said second elemental areas and having a nominal frequency determined by the rate of scanning said elemental areas, said signal transmission path being characterized by a phase delay between input and output terminals thereof, means to derive from said signal quantity a control quantity determined by the variations of the frequency of said signal quantity from the said nominal frequency value thereof, a phase modulator coupled to the output of said signal transmission circuit, and means to apply said control quantity to said phase modulator to thereby phase modulate the said signal quantity at the output of said signal transmission circuit as a function of said variations of the frequency of said signal quantity from the said nominal frequency value thereof.

5. A cathode-ray tube system as claimed in claim 4 wherein said signal transmission circuit has a variable phase delay determined by variations of the frequency of the said signal quantity from the said nominal frequency value thereof and wherein said means to produce said control quantity comprises a frequency sensitive discriminator system coupled to the output of said signal transmission circuit.

6. A cathode-ray tube system as claimed in claim 4 further comprising means to produce a signal determined by the rate of change of said first mentioned control quantity and means to apply said signal to said phase modulator as a further control quantity therefor.

7. A cathode-ray tube system comprising a cathode-ray tube having a source of a beam of charged particles and a beam intercepting member, said beam intercepting member comprising a plurality of first elemental areas having a first given response characteristic upon impingement by said beam and comprising second elemental areas having a given response characteristic upon impingement of said beam different from the response characteristic of said first elemental areas, said second elemental areas being arranged in a geometrical configuration indicative of the geometrical configuration of said first elemental areas, means for scanning said beam across said first and second elemental areas at a given nominal rate to thereby energize said first and second elemental areas, a signal transmission path for deriving a signal quantity determined by the response characteristic of said second elemental areas and having a nominal frequency determined by said nominal rate of scanning said elemental areas, said signal transmission path being characterized by a phase delay between input and output terminals thereof, an oscillator source of a signal wave having a nominal frequency equal to the nominal frequency of said quantity, means to derive from said signal quantity a first control quantity determined by the variations of the frequency of said signal quantity from the said nominal frequency value thereof, means to produce a second control quantity determined by the phase difference between said signal wave and said signal quantity at the output of said signal transmission path, means to algebraically add said first and second control quantities to produce a resultant quantity, and means responsive to said resultant quantity to phase modulate said signal wave.

8. A cathode-ray tube system as claimed in claim 7 further comprising means to produce a third control quantity determined by the rate of change of said first control quantity, and means to algebraically add said third control quantity with said first and second control quantities to produce said resultant quantity.

9. A cathode-ray tube system for reproducing a color television image, comprising a cathode-ray tube having a source of a beam of charged particles, means to vary the intensity of said beam and a beam intercepting member, said beam intercepting member comprising consecutively arranged groups of three phosphor stripes, the stripes of each of said groups being adapted to produce light of different colors in response to impingement by said beam, said beam intercepting member further comprising a plurality of elemental areas having a given response characteristic upon impingement by said beam different from the response characteristic of said phosphor stripes, said elemental areas being arranged in a geometric configuration indicative of the geometric configuration of said phosphor stripes, means for scanning said beam across said beam intercepting member at a given nominal rate and in a direction transverse to said phosphor stripes to thereby energize said phosphor stripes and said elemental areas, a signal transmission path for deriving a signal quantity having an amplitude determined by the response characteristic of said elemental areas and having a nominal frequency determined by said nominal rate of scanning said beam intercepting member, said signal transmission path being characterized by a phase delay between input and output terminals thereof, means to derive from said signal quantity a control quantity determined by the variations of the frequency of said signal quantity from the said nominal frequency value thereof, a phase modulator coupled to the output of said signal transmission path, means to apply said control quantity to said phase modulator thereby to phase modulate the said signal quantity at the output of said signal transmission path as a function of the variations of said signal quantity from the said nominal frequency value thereof, means to apply to said beam intensity varying means a wave having variations indicative of desired variations of the response of said phosphor stripes, and means responsive to said phase modulated signal quantity to control the time-phase positions of the variations of said wave.

10. A cathode-ray tube system for reproducing a color television image, comprising a cathode-ray tube having a source of a beam of charged particles, means to vary the intensity of said beam and a beam intercepting member, said beam intercepting member comprising consecutively arranged groups of three phosphor stripes, the stripes of each of said groups being adapted to produce light of different colors in response to impingement by said beam, said beam intercepting member further comprising a plurality of elemental areas having a given response characteristic upon impingement by said beam different from the response characteristic of said phosphor stripes, said elemental areas being arranged in a geometric configuration indicative of the geometric configuration of said phosphor stripes, means for scanning said beam across said beam intercepting member at a given nominal rate and in a direction transverse to said phosphor stripes to thereby energize said phosphor stripes and said elemental areas, a signal transmission path for deriving a signal quantity having an amplitude determined by the response characteristic of said elemental areas and having a nominal frequency value determined by the said nominal rate of scanning said beam intercepting member, said signal transmission path being characterized by a phase delay between input and output terminals thereof, means to apply to said beam intensity varying means a wave having variations indicative of desired variations of the response of said phosphor stripes, an oscillator source of a second wave for energizing said latter means, said second wave having a nominal frequency value substantially equal to the nominal frequency value of said signal quantity, means to derive from said signal quantity a first control quantity determined by the variations of the frequency of said signal quantity from the said nominal frequency value thereof, means to produce a second control quantity determined by the phase difference between the said second wave and the signal quantity at the output of said signal transmission path, means to algebraically add said control quantities to produce a resultant quantity, and means responsive to said resultant quantity to phase modulate said oscillator source thereby to control the time phase position of said wave applied to said beam intensity varying means.

References Cited in the file of this patent

UNITED STATES PATENTS

| | | |
|---|---|---|
| 2,431,115 | Goldsmith | Nov. 18, 1947 |
| 2,461,515 | Bronwell | Feb. 15, 1949 |
| 2,529,485 | Chew | Nov. 14, 1950 |
| 2,532,511 | Okolicsanyi | Dec. 5, 1950 |
| 2,606,246 | Sziklai | Aug. 5, 1952 |
| 2,617,876 | Rose | Nov. 11, 1952 |